Figure 1:
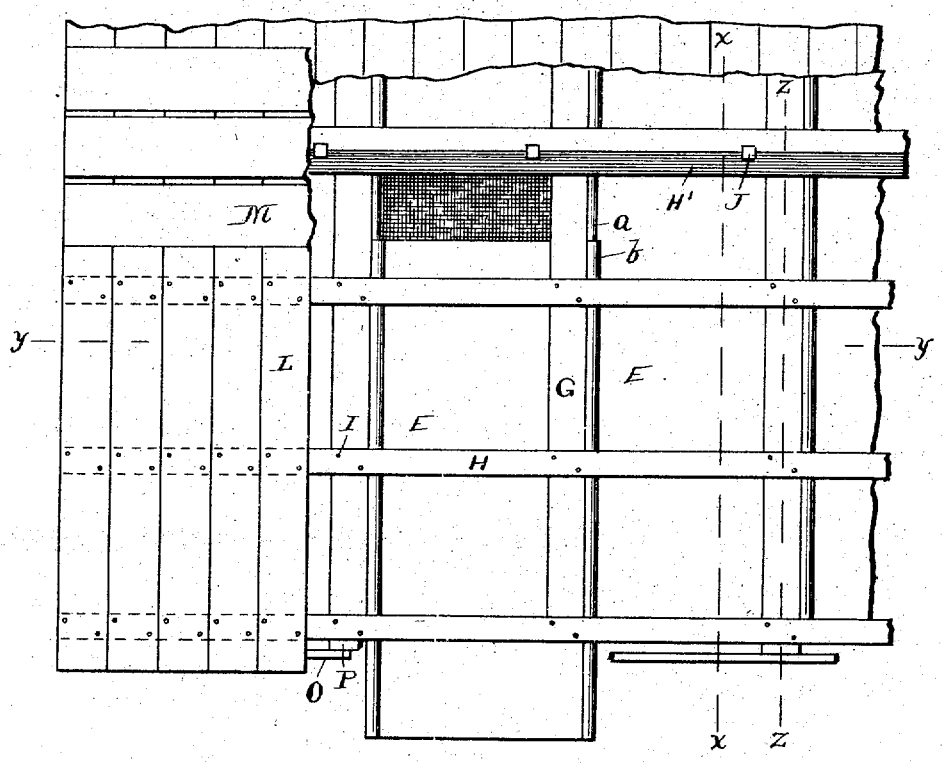

No. 11,729. Reissued Apr. 4, 1899.

C. H. HUTCHINS.

DOUBLE CAR ROOF.

(Application filed Feb. 3, 1899.)

2 Sheets—Sheet 1.

WITNESSES:

Lewis C. Curtis

A. W. Munday.

INVENTOR:

CHARLES H. HUTCHINS

BY Munday, Evarts & Adcock

HIS ATTORNEYS.

No. 11,729. Reissued Apr. 4, 1899.

C. H. HUTCHINS.

DOUBLE CAR ROOF.

(Application filed Feb. 3, 1899.)

2 Sheets—Sheet 2.

WITNESSES:
Sew. C. Curtis
H. W. Munday.

INVENTOR:
CHARLES H. HUTCHINS
BY Munday, Evarts & Adcock
HIS ATTORNEYS.

UNITED STATES PATENT OFFICE.

CHARLES H. HUTCHINS, OF DETROIT, MICHIGAN.

DOUBLE CAR-ROOF.

SPECIFICATION forming part of Reissued Letters Patent No. 11,729, dated April 4, 1899.

Original No. 617,289, dated January 3, 1899. Application for reissue filed February 3, 1899. Serial No. 704,436.

*To all whom it may concern:*

Be it known that I, CHARLES H. HUTCHINS, a citizen of the United States, residing at Detroit, in the county of Wayne and State of Michigan, have invented certain new and useful Improvements in Double Car-Roofs, of which the following is a specification, reference being had therein to the accompanying drawings.

This invention relates to the construction of so-called "double roofs," in which a sheet-metal covering is provided beneath the usual wooden covering and separated by an air-space therefrom. The advantages of such double roofs are well understood; but the constructions in present use have not given satisfaction as to their durability. I have discovered the reason in the fact that on account of the metal plates being rigidly secured or held in place by the roof-frame and thus being made a structural element of the roof the rigidity of the same has been increased in a manner to make such roofs particularly liable to receive injury from severe shocks and jars to which freight-cars are frequently subjected in switching or from other causes incidental to their use, and the difference in the character of the two materials causes the metal plates to tear loose and form open joints and leaks in the metal covering, while at the same time the unequal strains produced thereby between the wood and metal injuriously affect the whole structure. The unequal expansion and contraction of wood and metal under the influence of heat and cold is also a destructive feature in such roofs, and while this had been sought to be overcome by constructing the metal covering of a number of disconnected plates the advantage of a continuous metal roof was sacrificed and the chances of leakage increased.

The object of my invention is to remedy these defects and to give further advantages in the facility of repairing such roofs, which frequently are subjected to accidents, resulting in local injury to the metal covering, which in the present construction cannot be repaired without practically necessitating the rebuilding of the entire roof.

To this end my invention comprises the construction and arrangement of the metal covering of the roof and the manner of combining it with the frame thereof, all as more fully hereinafter described, and particularly set forth in the claims.

Figure 2:
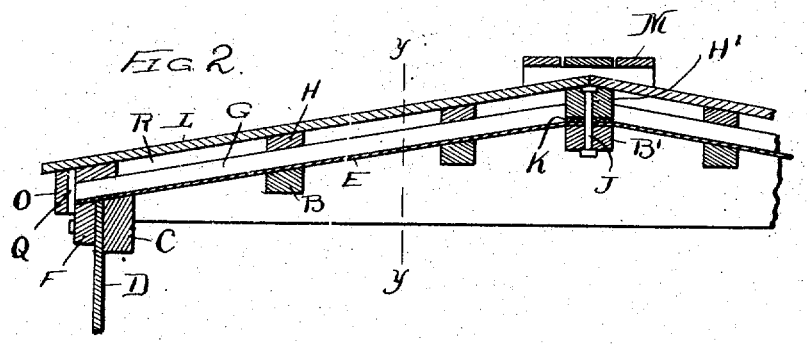
Figure 4:
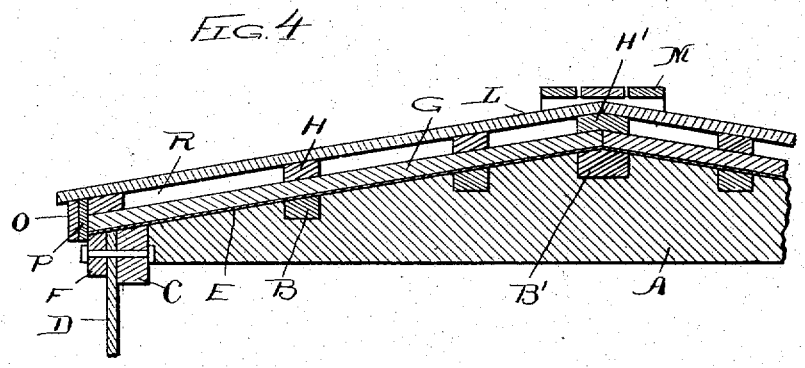
Figure 3:
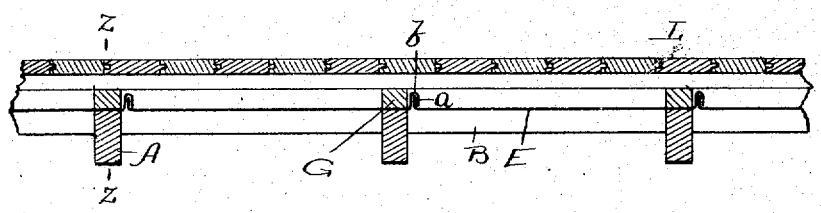

In the drawings which illustrate a practical embodiment of my invention, Figure 1 is a plan view of my improved car-roof with a portion of the wooden sheeting removed. Fig. 2 is a vertical cross-section on line *x x*, Fig. 1. Fig. 3 is a vertical longitudinal section on line *y y*, Figs. 1 and 2; and Fig. 4 is another vertical cross-section on line *z z*, Figs. 1 and 3.

A represents the carlines of the roof, B the purlins, B′ the ridge-purlin, C the plates, D the siding secured to the plates, and F the facia, all arranged to form a supporting roof-frame.

E are the metal plates forming the metal covering of the roof. Each plate is of a length to extend from the center of the roof to the outer edge, and has formed along one side a standing flange *a* and along the opposite side an inverted-U-shaped flange *b*, adapted to embrace the flange *a* of the adjacent plate, and in this manner a number of plates of suitable width are joined together to form a complete metallic covering for the whole roof, and this covering is in no way attached to any part of the roof-frame, upon which it is supported, and rests freely thereon without being in any way united thereto. Above the metal roof thus formed the supersheeting is supported in the following manner: On top of the metal plates are placed the supercarlines G, which in length are coextensive with the metal plates, and on top of these are placed the superpurlins H, which at the point of intersection with the supercarlines are secured thereto by nails I or otherwise.

Upon the ridge-purlins B′ a superridge-purlin H′ is placed and secured thereto by bolts J or otherwise, and preferably a packing K interposed between the two to form a water-tight joint along the center of the metal roof. In this manner a superframe is formed upon which the usual sheeting L, of boards, is secured, and upon this the footboard M, supported on sill-hooks, is arranged in the usual way.

Along the sides, close under the eaves of the sheeting, is secured removably, by screws or otherwise, an outside facia O, with small spacing-blocks P interposed between it and the facia F in such manner as to form an air-passage Q, communicating with the air-space R, formed between the metal covering and the wooden sheeting on top, and a free drip for any water which may collect on the metal plates. By this construction the metal plates are entirely free and disconnected from the framework of the roof, and the joints of the plates permit such a free adjustment of one plate in relation to another as will preclude any transmission of shocks and jars from one to another.

The metal plates of the roof instead of performing the office of braces in the structural arrangement of the roof, as they do in present constructions, are thus eliminated as a factor which impairs the flexibility of the wooden portion, and thereby its ability to withstand the hard usage which it is subjected to under the various contingencies of its use. At the same time the metal roof is continuous and its durability is assured, and should occasion require to perform any local repair to any portion of the metal covering all that is required is to remove the outer facia, which retains the plate, and pull the plate out endwise.

What I claim as my invention is—

1. In a double car-roof, the combination of a main-roof frame supported upon the car sides and comprising purlins and carlines, a continuous sheet-metal covering laid upon said carlines and formed of a series of plate-sections extending from the eaves to the ridge, standing joints formed at the edges of the sections which form sliding connections between the same, and an upper-roof frame having carlines resting upon said plates directly above the carlines of the main frame, purlins connecting said carlines, a roof-covering on the purlins, and a detachable facia at the outer ends of the superroof, the sections of the sheet-metal covering being removable upon the removal of said facia.

2. In a double car-roof, the combination of a main-roof frame supported upon the sides of the car and comprising purlins and carlines, a continuous sheet-metal covering laid upon said carlines and formed of a series of plate-sections extending from the eaves to the ridge, standing joints formed at the edges of the sections which form sliding connections between the same, an upper-roof frame having carlines resting upon said metal plates vertically above the carlines of the main-roof frame and adjacent to said standing joint, purlins connecting said carlines, a roof-covering on the purlins, and a detachable facia at the outer ends of the superroof, the sections of sheet metal being removable upon the removal of the facia.

3. In a car, the combination with a main-roof frame united to the frame of the car and comprising carlines and purlins and a ridge-purlin, of a superroof-frame comprising carlines and purlins and a ridge-purlin, a board roof secured to said superframe, and a longitudinally-continuous sheet-metal roof composed of a series of independently-removable metal plates extending from the eaves to the ridge between said main frame and superframe, said metal plates being joined directly together at their adjacent side edges by loose standing joints adapted to permit the necessary lateral movement of the plates in respect to each other to prevent injury thereto or to the roof as a whole by the straining of the car or variations in temperature and also to permit each metal plate to be independently removed or inserted without disturbing the others or said wood roof or superframe, substantially as specified.

4. In a car, the combination with a main roof united to the frame of the car and comprising carlines and purlins and a ridge-purlin, of a superroof-frame comprising carlines and purlins and a ridge-purlin, a board roof secured to said superframe, and a longitudinally-continuous sheet-metal roof composed of a series of independently-removable flat metal plates extending from the eaves to the ridge between said main frame and superframe, said metal plates being joined directly together at their adjacent side edges by loose standing joints adapted to permit the necessary lateral movement of the plates in respect to each other to prevent injury thereto or to the roof as a whole by the straining of the car or variations in temperature and also to permit each metal plate to be independently removed or inserted without disturbing the others or said wood roof or superframe, said loose standing joints consisting each of a high upright flange on the edge of one sheet and a high inverted-U fold on the meeting edge of the adjacent sheet, substantially as specified.

5. In a car, the combination with a main-roof frame united to the frame of the car and comprising carlines and purlins and a ridge-purlin, of a superroof-frame comprising carlines and purlins and a ridge-purlin, a board roof secured to said superframe, and a longitudinally-continuous sheet-metal roof composed of a series of independently-removable metal plates extending from the eaves to the ridge between said main frame and superframe, said metal plates being joined directly together at their adjacent edges by loose standing joints adapted to permit the necessary movement of the plates in respect to each other to prevent injury thereto or to the roof as a whole and also to permit each metal plate to be removed or inserted without disturbing the others or said wood roof or superframe, and bolts extending centrally through said main-ridge purlin and said superridge-purlin between the meeting or adjacent ends of the oppositely-inclined metal plates, substantially as specified.

6. In a car, the combination with a main-roof frame united to the frame of the car and comprising carlines and purlins and a ridge-purlin, of a superroof-frame comprising carlines and purlins and a ridge-purlin, a board roof secured to said superframe, and a longitudinally-continuous sheet-metal roof composed of a series of independently-removable flat metal plates extending from the eaves to the ridge between said main frame and superframe, said metal plates being joined directly together at their adjacent edges by loose standing joints adapted to permit the necessary movement of the plates in respect to each other to prevent injury thereto or to the roof as a whole and also to permit each metal plate to be removed or inserted without disturbing the others or said wood roof or superframe, and bolts extending centrally through said main-ridge purlin and said superridge-purlin between the meeting or adjacent ends of the oppositely-inclined metal plates, said loose standing joints consisting each of a high upright flange on the edge of one sheet and a high inverted-U fold on the meeting edge of the adjacent sheet, substantially as specified.

7. The double car-roof inclined in two planes from eaves to ridge comprising a main frame and a superframe, the superframe being covered by boards and the main frame covered by a series of loose metal sheets unconnected with said frames and each extending from the eaves to the ridge and joined together to form a longitudinally-continuous roof on each side of the car by means of loose standing joints formed of a high upright flange on one sheet and a high inverted-U fold on the adjacent sheet, whereby the sheet metal forms a continuous waterproof sheathing, the sheets of which are given opportunity to expand and contract under varying temperatures and to move laterally in respect to each other, and are held from disengagement from each other under shocks and strains to and of the car when in use, and are rendered capable of each being easily and independently removed by sliding the same out at the eaves to facilitate repair, substantially as specified.

8. The sheet-metal subroof for railroad-cars consisting of a series of sheets each extending from the eaves to the ridge, each sheet being connected to the adjacent sheet by means of the joint shown, and which consists of a high upright flange on the edge of one and a high inverted-U-shaped fold on the edge of the adjacent sheet, making a water-tight joint which is loose to permit sliding movement to remove the sheets for repair, and loose to permit lateral movement of the sheets in respect to each other under strains and expansion and contraction and the parts of which will not be disengaged by shocks and strains to which the car is subjected in ordinary use, substantially as specified.

9. The double car-roof comprising a main frame, a superframe covered with roof-boards, and a continuous loose flexible sheet-metal roof fitting between said main and super frames and extending continuously from end to end of the car and from eaves to ridge without bracing connection with either of said frames and composed of a series of independently-removable plates loosely and flexibly joined together at their meeting side edges by high standing joints consisting each of a high upright integral flange on one sheet and an integral open inverted-U fold on the adjacent sheet, substantially as specified.

10. The double car-roof comprising a main frame, a superframe covered with roof-boards, and a longitudinally-continuous loose flexible sheet-metal roof fitting between said main and super frames and extending continuously from end to end of the car and from eaves to ridge without bracing connection with either of said frames and composed of a series of independently-removable flat plates loosely and flexibly joined together at their meeting side edges by high standing joints consisting each of a high upright integral flange on one sheet and an integral open inverted-U fold on the adjacent sheet, substantially as specified.

CHARLES H. HUTCHINS.

Witnesses:
H. M. MUNDAY,
EDMUND ALCOCK.